E. L. KLINGEL.
THERMOSTAT.
APPLICATION FILED JAN. 22, 1920.
1,403,963.
Patented Jan. 17, 1922.
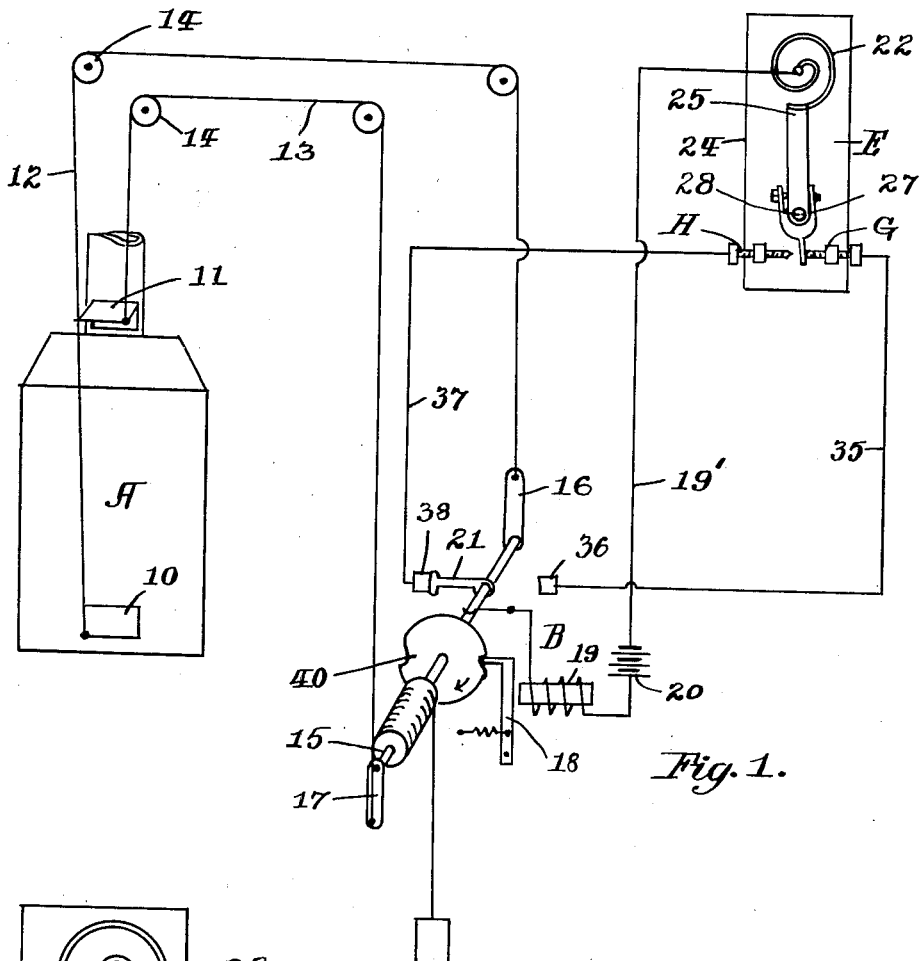
Fig. 1.
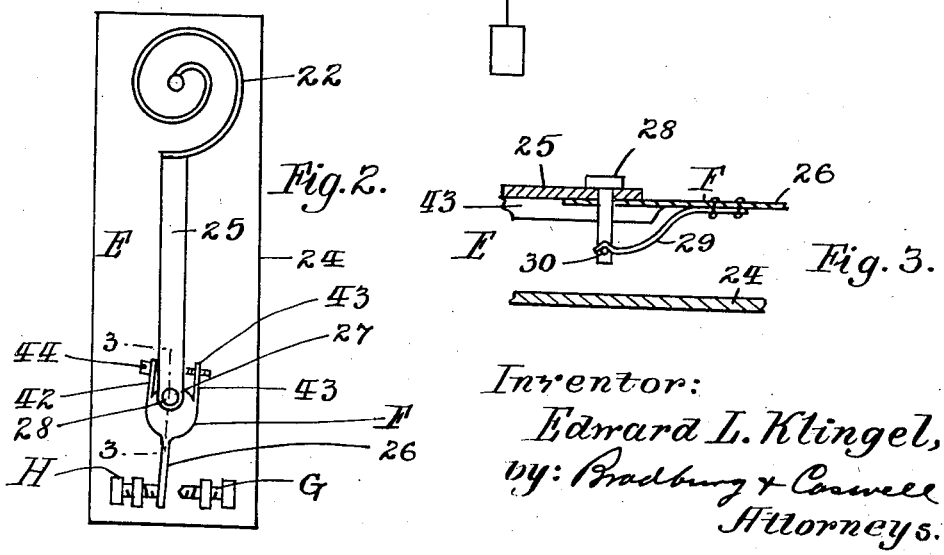
Fig. 2.
Fig. 3.
Inventor:
Edward L. Klingel,
by: Bradbury & Coswell
Attorneys.

UNITED STATES PATENT OFFICE.

EDWARD L. KLINGEL, OF ST. PAUL, MINNESOTA.

THERMOSTAT.

1,403,963.

Specification of Letters Patent.  Patented Jan. 17, 1922.

Application filed January 22, 1920. Serial No. 353,314.

*To all whom it may concern:*

Be it known that I, EDWARD L. KLINGEL, a citizen of the United States, residing at St. Paul, in the county of Ramsey and State of Minnesota, have invented a new and useful Improvement in Thermostats, of which the following is a specification.

This invention relates to thermostats of that class for use in controlling damper regulators on furnaces through the action of electric current. More particularly my invention relates to improvements in temperature regulators, which employ a thermostat to make electrical contacts. Its primary object is to obtain closer regulation under certain conditions than is now possible with existing regulators.

Regulators of this kind usually have two electrical contacts, one of which is "closed" when the temperature of the surrounding atmosphere falls below a predetermined point and the other "closed" when the temperature rises above the predetermined point. The contact which closes below the normal temperature is usually termed the "cold contact", and the contact which closes above normal the "hot contact."

Now assume that it is desired to maintain the temperature of a room at or near 70 degrees Fahrenheit. By close adjustment of the contacts, the thermostat can be made to close the "cold contact" at 69 degrees, (thus putting in operation the heating device) and to close the "hot contact" at 71 degrees (thus stopping the heating device).

It will be readily seen that there is considerable "lag" between the operation of the heating device dampers and the room temperature. As an example assume the temperature of a certain room to be 67 degrees while the thermostat is set for 70 degrees. Under this condition the "cold contact" would be closed and the heating device dampers open to obtain more heat. Presently the action of the heating device would cause the room temperature to rise and when it reached 71 degrees, the "hot contact" would be closed and the heat turned off. However, the heating device has generated considerable heat that has not been radiated to the room atmosphere and this heat is radiated for some time after the dampers are closed, thus causing the room temperature to rise to perhaps 74 degrees.

The heating device now being shut off, the room temperature gradually falls to 69 degrees which causes the closing of the "cold contact", which in turn opens the draft dampers for more heat. Since the room temperature is falling, it will continue to fall several degrees before the open heating device has effect on the room temperature.

My device is designed to remedy this condition in a simple and effective manner by shutting off the heating device at some point below the desired temperature, when the temperature is rising from below this point, and to turn on the heating device at some point above the desired temperature when the temperature is falling from above this point.

Thus in the case previously cited, my improvement would cause the "hot contact" to close and shut off the heating device at 69 degrees instead of 71 degrees, so the room temperature would rise to 72 degrees instead of 74 degrees.

When the temperature began to fall, "cold contact" would close at 71 degrees instead of 69 degrees, thus allowing a drop to 69 degrees instead of 67 degrees.

One embodiment of my invention is illustrated in the accompanying drawing for producing the above improved result but it will be understood that other constructions can be employed for carrying my invention into use within the spirit thereof.

In the drawing, Fig. 1 is a diagrammatic view showing my invention applied for use with a furnace or other heating appliance to control the operation of its check and draft dampers; Fig. 2 is an enlarged plan view of my improved thermostat, and Fig. 3 is a section taken on the line 3—3 of Fig. 2.

In the drawing A indicates a furnace of usual type having a draft damper 10 and a check damper 11, which are adapted to be operated by the usual flexible connections 12 and 13 traversing antifriction guide sheaves 14. B indicates diagrammatically a weight operated motor having the usual drive shaft 15 and crank arms 16 and 17 to which the flexible connections 12 and 13 are attached, the arrangement being so that when the draft damper 10 is closed the check damper 11 is open and vice versa when the draft damper 10 is open the check damper 11 is closed. The operation of the motor is controlled in the usual manner by armature controlled pawl 18, the armature being drawn into releasing position by the magnet 19, to the coil which the circuit conductor 19' containing battery 20 is connected. One end of this conductor is connected to the motor operated switch arm 21 and the other end is connected to the thermostatic spring coil 22 of my improved thermostat E.

My improved thermostat E consists of said thermostatic spring 22, which is mounted upon a support 24 of any suitable construction. The free end of the thermostatic spring carries the usual lever switch arm 25 and on the free end of said arm is what I have chosen to term a "lag justifier" F, which consists of an auxiliary arm 26, journaled on arm 25 by a friction joint 27. One form of this joint is illustrated in Fig. 3 wherein arm 26 is pivoted by bolt 28 passing through arm 26 and arm 25 and held under spring tension by the spring 29 fastened to arm 26 and engaging over the ends of the pin 30 passing through the lower end of the shank of the bolt 28. The outer free end of the arm 26 plays between hot and cold adjustable contacts G and H, which are mounted upon the support 24. These contacts are adjusted in the usual manner, so that when the thermostat is set it will make contact through the movement of thermostatic element 22 first with one and then the other of said contacts when the temperature rises or falls above or below normal. The hot contact element G is connected by the electrical conductor 35 to the switch contact 36 in the motor and the cold contact H is connected by the conductor 37 with the switch contact 38 in said motor. These switch contacts 36 and 38 are arranged in opposite position so that as switch arm 21 is revolved by the shaft of the motor, it will make connection first with contact 36 and then with contact 38, each succeeding half revolution in the usual manner, the pawl 18 serving to engage a ratchet wheel 40 on the shaft of the motor and stop the motor until the electric current passing through the thermostat is reversed in the usual manner. The "lag justifier" is formed on opposite sides of the arm 25 with a pair of spring arms 42 and 43, said arms being integral with the auxiliary arm 26 and their ends being bent inwardly and adapted to strike against the opposite sides of arm 25 when the arm 26 is moved in the arc of a circle upon its pivot support. The free ends of arms 42 and 43 are drawn inwardly by a screw 44 to adjust the degree of the arc in which the arm 26 is adapted to travel.

The operation in connection with the customary type of heating plant is as follows:

Assuming the room temperature to be several degrees below the desired point, arm 26 bears against contact H with enough pressure to shift the position of arm 26 as shown in Fig. 2. Assuming the electrical contact between arm 26 and contact H has caused the heating device to "open" (that is to function), and the room temperature gradually rises. Slightly before the desired temperature is reached, arm 26 leaves contact H and makes contact with contact G. This causes the heating device to close (that is cease to function). The room temperature will continue to rise for a time due to the headway gained by the heating device and will probably exceed the desired temperature by one or two degrees. This increase causes pressure between arm 26 and contact G, which shifts arm 26 in position shown in Fig. 1. As the temperature begins to recede, this position of arm 26 allows contact with contact H, thus reopening the heating device slightly above the desired or normal temperature, allowing the heating device to get under headway before the temperature drops too far. Thus there is an instant reversal in operation of the heating device when there is a reversal in temperature without any "lag."

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:

1. A thermostat having a switch member governed in movement by changes in temperature and a pair of electrical contacts with which said switch member is adapted to alternately contact as said temperature increases or decreases, said switch member having a non-spring lag rectifier whereby said switch member is always caused to substantially instantly make reverse contact automatically when the temperature reverses.

2. A thermostat having a substantially inelastic and pliable thermostatically controlled switch arm and a pair of electrical contacts with which said arm is adapted to alternately contact as the temperature increases or decreases, said arm being adapted to automatically rectify lag in the operation of a heating element, by which said thermostat is influenced.

3. A thermostat having a switch arm and a pair of electrical contacts with which said arm is adapted to make contact alternately, said arm having a non-spring lag rectifier, for the purposes specified.

4. A source of heating medium having electrically controlled means for increasing or decreasing the amount of heat supplied thereby, and thermostatic controlled means having a pair of hot and cold electrical contact points and a switch member connected with said electrically controlled means, said switch member having an auxiliary switch member movably connected therewith and adapted to make contact alternately with said contact points as the temperature of the medium influencing said thermostat increases or decreases to automatically control the operation of said electrically controlled means and having free lag movement always causing substantially instant reverse connection with an opposite contact point when the temperature of said medium reverses.

In testimony whereof, I have signed my name to this specification.

EDWARD L. KLINGEL.